T. A. EDISON.
REPRODUCER.
APPLICATION FILED MAY 18, 1911.
1,055,621. Patented Mar. 11, 1913.
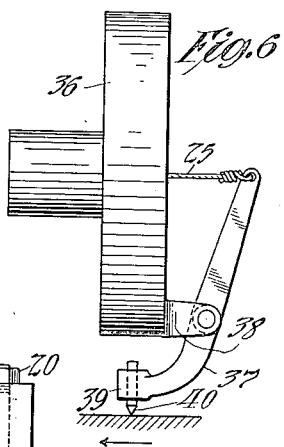
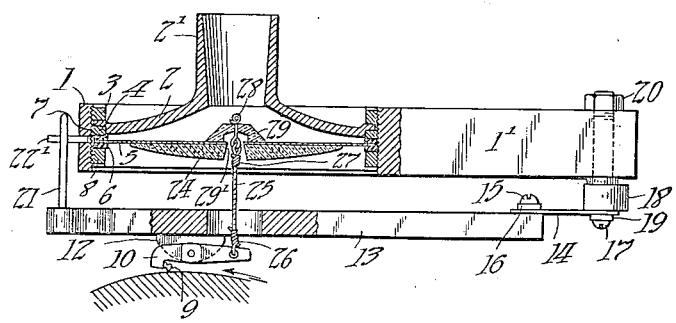
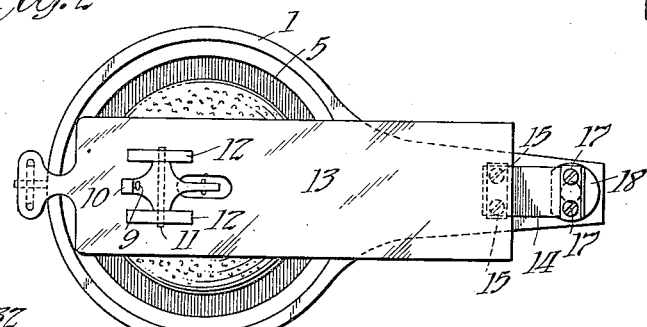
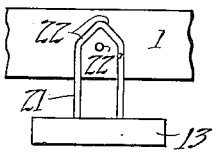
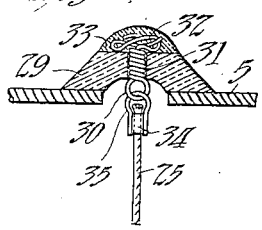
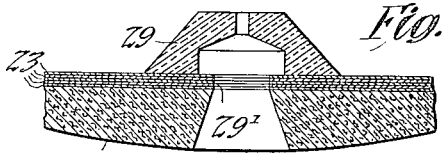
Witnesses:
Frank D. Lewis
Frederick Bachmann
Inventor:
Thomas A. Edison
by Frank L. Dyer
his Atty.

UNITED STATES PATENT OFFICE.

THOMAS A. EDISON, OF WEST ORANGE, NEW JERSEY, ASSIGNOR TO THOMAS A. EDISON, INCORPORATED, OF WEST ORANGE, NEW JERSEY, A CORPORATION OF NEW JERSEY.

REPRODUCER.

1,055,621.      Specification of Letters Patent.      Patented Mar. 11, 1913.

Application filed May 18, 1911. Serial No. 627,952.

*To all whom it may concern:*

Be it known that I, THOMAS A. EDISON, a citizen of the United States, and a resident of West Orange, in the county of Essex and State of New Jersey, have invented certain new and useful Improvements in Reproducers, of which the following is a specification.

My invention relates to reproducers for phonographs and other sound reproducing apparatus and my principal object is to provide a device of this character whereby an improved quality of reproduction can be obtained.

It has heretofore been customary to connect the tail of the stylus lever to the diaphragm by means of a rigid metal link. This structure is objectionable in that the diaphragm cannot move quickly enough to permit the stylus to remain in engagement with the record groove so that the stylus jumps over the forward walls of the deep indentations and after striking the bottom of the indentations rebounds from the record and causes the production of sharp unpleasant sounds. Slight defects in the record furthermore cause the transmission to the diaphragm of objectionable weak sounds, and the suddenness or abruptness of the sound waves causes the emission of sharp metallic sounds. Furthermore it is impossible to form a metallic connecting link perfectly straight; and as the weight used with reproducers is never sufficient to straighten out the flat bow commonly found in such a link, the vibration of the stylus lever produces therein local vibrations whereby the loudness and accuracy of the reproduction are greatly impaired.

I have found that the above defects may be remedied by employing an elastic resilient connection, such as a cotton string to connect the stylus lever to the diaphragm. Such a connection is of very small weight, and therefore responds readily to the elastic power stored therein to hold the stylus continuously in engagement with the record groove. It also through its short elasticity absorbs the objectionable weak sounds mentioned above and diminishes the suddenness and abruptness of the sound waves so that a very pleasing mellow tone is obtained. By choosing a connection of proper elasticity and diameter, and properly adjusting the length thereof, the quality of the reproduction may obviously be varied at will. As a weight of small mass is sufficient to hold my improved connection taut, the objections due to the curved form of metal links are eliminated.

My invention furthermore comprises an improved diaphragm of such lightness and flexibility that the weight of the reproducer and the consequent wear on the record can be materially decreased.

Other features of my invention are an improved connection between the diaphragm and stylus lever whereby the distortion of the diaphragm during the reproduction of the record is prevented, and an improved mounting for the stylus lever whereby the same is caused to more readily and faithfully track the record groove.

Further objects of my invention will appear more fully in the following specification and appended claims.

In order that my invention may be better understood, attention is hereby directed to the accompanying drawings forming part of this specification and in which—

Figure 1 is a side elevation partly in section showing a reproducer embodying my invention; Fig. 2 is a bottom plan view thereof; Fig. 3 is a front elevation showing a detail of construction; Fig. 4 is an enlarged central vertical section showing another detail of construction; Fig. 5 is a view similar to that shown in Fig. 4 of a modification; and Fig. 6 is a side elevation of another modification.

In all the views, like parts are designated by the same reference numerals.

The sound box comprises an annular member 1 having an extension 1' and an upper conical member 2 provided with a neck 2', the periphery of the member 2 being secured between two rings 3 and 4, threaded into the interior of the annulus 1. The diaphragm 5 is mounted between rubber gaskets 6 and 7 which in turn are secured between the ring 4 and a third ring 8 threaded into the bottom of the member 1. The stylus 9 is mounted in a lever 10 rotatably supported on a pivot 11 which is mounted at its ends in spaced bearings 12 projecting downwardly from the lower surface of the weight 13. In order to prevent the record from throwing the stylus lever and stylus sidewise on its pivot, and thus emitting objectionable foreign sounds, I make the bearing of the said lever of considerable width, preferably substantially as wide as the tracking arm of the lever is long, a sufficient width being preferably obtained for the bearing by providing the lever with laterally offset or projecting portions through which the pivot 11 passes, as shown. As clearly shown in Figs. 1 and 2, I make the weight 13 of considerable length and mount the same at a considerable distance from the place at which the stylus lever is secured thereto, thus providing a structure wherein the pivotal movement of the floating weight in following the irregularities of the record is very slight; so that the said weight, by reason of the increased leverage obtained, is readily adjusted by the stylus in tracking the record groove. The floating weight is connected to the outer end of the extension 1' in the following manner: A spring 14 or other suitable elastic member is secured at its forward end by means of screws 15 to the rear end of the weight 13, washers 16 being inserted between the heads of the said screws and the spring 14. At its opposite end, the spring 14 is secured by screws 17 to a headed pivot member 18 loosely swiveled in a vertical opening in the outer end of the extension 1'. The numeral 19 represents washers inserted between the screws 17 and the head of the member 18, and the numeral 20 a nut for securing the pivot member 18 in place. The swiveling or pivoting of the floating weight as described above permits the stylus to track close to the center of the record groove and thus eliminates objectionable pressure on the sides of the record groove.

The elastic spring connection described above is evidently free from objectionable looseness such as is practically unavoidable in the ordinary pivot joints employed for mounting floating weights, it being practically very difficult to make a small pivotal connection tight without binding.

Secured to the front of the floating weight, is a loop 21 having an upper portion 22 in the shape of an inverted V, this latter portion being adapted to be engaged by a pin 22' secured to the front of the member 1 to center and support the floating weight when the reducer is raised from operative position.

The diaphragm 5 is made of a very light and flexible material so that it is possible to reduce the weight on the stylus and thus diminish the wear on the record and cause a more faithful production from the record. The body portion of the diaphragm is preferably built up of a number of layers of elastic fibrous material, sheets 23 of Japanese paper about .001 of an inch thick being preferably employed. These sheets are thinly lacquered, then placed in the air to dry, then assembled together to the required thickness, and finally cemented into a unitary structure by the application of heat and pressure. A suitable thickness for a diaphragm two inches in diameter is .005 of an inch. To this body portion is secured by shellac or other suitable means, a center piece 24 of cork or other suitable elastic yielding material. This center piece 24 is made comparatively thick at the center, tapers off toward its edge, and covers a large portion of the area of the diaphragm. For a diaphragm two inches in diameter, I have found that the center piece should be about one-eighth of an inch thick at the center, and about one and one-half inches in diameter. The curvature of the outer surface of the center piece 24 should be such that substantially the whole body portion of the diaphragm flexes into a spherical shape during the vibration thereof by the stylus.

Such a diaphragm as described above not only has elasticity as a whole, but it is made of a material which is internally highly elastic, thus requiring a minimum of power to set it in motion. The diaphragm is further advantageous as it is stable and does not change with use, the whole diaphragm being extremely light in weight compared with those in general use, and being at the same time by reason of the employment of the relatively thick center piece free from strains which permit local buckling when vibrations of great amplitude are emitted.

Another improvement contemplated by my invention is the substitution of an elastic, resilient, non-metallic member, such as a cotton cord 25, for the commonly employed metallic connecting link between the stylus lever and the diaphragm. This cord, as shown in the drawing, is connected at its ends by light flexible wires 26 and 27 or other suitable means to the tail of the stylus lever 10 and to the link 28 respectively. The link 28 fits closely in a vertical opening in a cup shaped cap or bridging member 29 which is secured to the upper face of the diaphragm by shellac or any other suitable means and extends across and a substantial distance above the central opening 29' provided in the diaphragm, a similar opening being formed in the cork member 24 immediately below the opening 29'.

As shown in Fig. 1, the upper portion of wire 27 is connected for universal movement to the lower portion of the link 28 substantially at the center of the diaphragm 5. By the term "center" as herein employed with reference to the diaphragm, I mean the point on the central axis of the diaphragm midway between the faces of the body portion of the diaphragm. With the construction herein disclosed the "center" of the diaphragm will be located midway between the extremities of the opening 29'. By connecting the cord 25 to the diaphragm in this manner, the power is so applied to the diaphragm that there is no distortion of the diaphragm when the connecting member 25 is inclined to the axis of the diaphragm, such distortion being unavoidable if the connecting member is connected to the diaphragm above or below the center or otherwise eccentrically thereof. The cup shaped cap 29 is preferably made of a hard material such as ivory and is formed with a large lower surface in engagement with the diaphragm, so that there is no local compression of the said member or the diaphragm and no loss of amplitude in the vibration.

As hereinbefore stated, the employment of an elastic resilient non-metallic connection such as the cord 25 for transmitting the vibrations of the stylus lever to the diaphragm serves as a means of mellowing the tone of the diaphragm and improving the quality of the reproduction, the quality being readily controlled by using a connection of suitable diameter and elasticity and by properly adjusting the length of the connection. Such a connection is sufficiently light to respond rapidly to the elastic power stored therein by the floating weight and thereby causes the stylus to more accurately track the record groove than if the same were joined to the relatively slowly moving diaphragm by a rigid connection. In my invention as above disclosed, both the diaphragm and the connection 25 serve through the tension imparted thereto by the floating weight to hold the stylus in engagement with the record, so that a very faithful reproduction is obtained.

In Fig. 5, I have shown a modified means for connecting the cord 25 to the diaphragm. A piece of wire bent to form a loop 30 at its lower end, is twisted as shown at 31 and passed through the vertical opening in the cap 29, being then bent down upon the top of the cap as shown at 32. The loop 30 is of sufficient size to bear upon the lower surface of the cap 29, and the upper portion 32 of the wire is secured to the top of the cap by a mass 33 of shellac in which the said upper portion is embedded. A ring 34 gripping the upper end of the cord 25 therein is suspended from the loop 30 by a wire loop 35 which passes through the loop 30 and is secured at its ends to the sides of the ring 34.

In Fig. 6, I have shown a vertically disposed sound box 36, having a stylus lever 37 pivoted to ears or lugs 38 projecting from the side of the sound box, the lever being provided with an offset portion 39 supporting the stylus 40 and extending under the sound box. With this construction, the weight of the sound box holds the elastic resilient cord 25 under tension and thereby causes the stylus to accurately track the record.

Many modifications, in addition to those described above, may be made in my invention, and I wish, therefore, not to be limited to the exact details shown and described.

What I claim as new and desire to protect by United States Letters Patent is as follows:

1. As an article of manufacture, a diaphragm composed of a plurality of superposed sheets of Japanese paper united into a unitary structure, substantially as described.

2. As an article of manufacture, a diaphragm composed of a plurality of superposed sheets of Japanese paper united into a unitary structure having secured thereto an elastic yielding member located concentrically with one of the faces of the said structure, and extending into proximity to the periphery thereof, the said elastic member being of decreasing thickness from the center to the periphery thereof, substantially as described.

3. In a device of the class described, the combination of a diaphragm, a support therefor, a floating weight, a stylus lever supported thereby, means for connecting said stylus lever to said diaphragm, and resilient means for securing said weight to said support, said weight being arranged to place said connecting means normally under tension substantially as described.

4. In a device of the class described, the combination with a diaphragm, a support therefor, a floating weight, a stylus lever mounted on said floating weight, means for connecting said lever to said diaphragm, and resilient means for connecting said weight to said support, said last named means being mounted to permit lateral movement of said floating weight, substantially as described.

5. In a device of the class described, the combination of a diaphragm, a support therefor, a floating weight, a stylus lever supported thereby, means for connecting said stylus lever to said diaphragm, and means comprising a flat spring for securing said weight to said support, said weight being arranged to place said connecting means normally under tension substantially as described.

6. In a device of the class described, the combination of a diaphragm having a central opening therein, a member separate from said diaphragm, mounted thereon, and forming a bridge across and at a substantial distance above said opening, securing means connected to said member and extending into said opening, a stylus lever, and connecting means between said securing means and said stylus lever, said connecting means being connected to said securing means at the center of said diaphragm, substantially as described.

7. In a device of the class described, the combination of a diaphragm having a central opening therein, a member separate from said diaphragm, mounted thereon, and forming a bridge across and at a substantial distance above said opening, securing means connected to said member and extending into said opening, a stylus lever mounted for movement laterally of as well as toward and away from said diaphragm, and connecting means between said securing means and said stylus lever, said connecting means being connected to said securing means at the center of said diaphragm and having universal movement with respect to said securing means, substantially as described.

8. In a device of the class described, the combination of a diaphragm having a central opening therein, a member separate from said diaphragm, mounted thereon, and forming a bridge across and at a substantial distance above said opening, securing means connected to said member and extending into said opening, a stylus lever, and elastic non-metallic connecting means between said securing means and said stylus lever, said connecting means being connected to said securing means at the center of said diaphragm, substantially as described.

9. As an article of manufacture, a diaphragm having a body portion composed of Japanese paper and a center piece of elastic material secured to one face of said body portion and having a diameter greater than one-half the diameter of said diaphragm, substantially as described.

10. As an article of manufacture, a diaphragm having a body portion composed of Japanese paper and a center piece of cork secured to one face of said body portion and having a diameter greater than one-half the diameter of said diaphragm, substantially as described.

11. In a device of the class described, the combination of a diaphragm, a support therefor having an extension thereon, an elongated floating weight, a stylus lever supported thereby, means for connecting said stylus lever to said diaphragm, and resilient supporting means having connections to said support and weight, said connections permitting lateral movement of said weight, substantially as described.

12. In a device of the class described, the combination with a diaphragm, a support therefor, a floating weight, a stylus lever having a horizontal bearing of considerable width relative to the length of the tracking arm of the lever mounted on said floating weight, means for connecting said lever to said diaphragm and resilient means for connecting said weight to said support, said means being mounted to permit lateral movement of said floating weight, substantially as described.

13. As an article of manufacture, a diaphragm formed of Japanese paper, substantially as described.

14. As an article of manufacture, a diaphragm having a body portion composed of elastic non-subereous material and a center piece of cork secured to one face of said body portion and having a diameter greater than one-half the diameter of said diaphragm, substantially as described.

15. As an article of manufacture, a diaphragm having a body portion composed of elastic non-subereous material and a center piece of cork secured to one face of said body portion and having a diameter greater than one-half the diameter of said diaphragm, the said center piece being of decreasing thickness from the center to the periphery thereof, substantially as described.

16. As an article of manufacture, a diaphragm having a body portion composed of a plurality of superposed sheets of elastic material united into a unitary structure and a member of cork located concentrically with one of the faces of the body portion and extending into proximity to the periphery thereof, substantially as described.

17. In a device of the class described, the combination of a diaphragm, a support therefor, a floating weight, a stylus lever supported thereby, resilient non-metallic means for connecting said stylus lever to said diaphragm, and resilient means for securing said weight to said support, said weight being arranged to place said connecting means normally under tension, substantially as described.

18. In a device of the class described, the combination of a diaphragm, a support therefor, a floating weight, a stylus lever supported thereby, means for connecting said stylus lever to said diaphragm, and resilient means for securing said weight to said support, said weight being movable upwardly and downwardly and being arranged to place said connecting means normally under tension, substantially as described.

19. As a new article of manufacture, a diaphragm of elastic material having a central opening therein, and an ivory bridging member mounted on said diaphragm above said opening, substantially as described.

This specification signed and witnessed this 16th day of May 1911.

THOMAS A. EDISON.

Witnesses:
FREDERICK BACHMANN,
ANNA R. KLEHM.